(12) United States Patent
Zhou et al.

(10) Patent No.: US 10,578,926 B2
(45) Date of Patent: Mar. 3, 2020

(54) ALIGNMENT FILM MATERIAL AND PREPARATION METHOD THEREOF, ALIGNMENT FILM, DISPLAY SUBSTRATE AND PREPARATION METHOD THEREOF, AND LIQUID CRYSTAL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yongshan Zhou, Beijing (CN); Jingpeng Li, Beijing (CN); Yuekai Gao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 383 days.

(21) Appl. No.: 15/256,911

(22) Filed: Sep. 6, 2016

(65) Prior Publication Data

US 2017/0192309 A1 Jul. 6, 2017

(30) Foreign Application Priority Data

Jan. 6, 2016 (CN) .......................... 2016 1 0007276

(51) Int. Cl.
*G02F 1/1337* (2006.01)

(52) U.S. Cl.
CPC .... *G02F 1/133788* (2013.01); *G02F 1/13378* (2013.01); *G02F 2202/36* (2013.01); *Y10T 428/10* (2015.01); *Y10T 428/1005* (2015.01)

(58) Field of Classification Search
CPC .......... G02F 1/133788; G02F 1/13378; G02F 2202/36; Y10T 428/10; Y10T 428/1005
See application file for complete search history.

(56) References Cited

U.S. PATENT DOCUMENTS

| 5,427,829 A * | 6/1995 | Mochizuki ........ G02F 1/133711 349/123 |
| 2009/0197011 A1* | 8/2009 | Lee ........................ H05K 3/102 427/532 |
| 2016/0004125 A1 | 1/2016 | Li et al. | |

FOREIGN PATENT DOCUMENTS

| CN | 102445787 A | 5/2012 |
| CN | 103554484 A | 2/2014 |
| CN | 103676331 A | 3/2014 |
| CN | 103827740 A | 5/2014 |
| WO | 2015/008744 A1 | 1/2015 |

OTHER PUBLICATIONS

The First Chinese Office Action dated Feb. 27, 2018, Appln. No. 201610007276.1.

* cited by examiner

*Primary Examiner* — Anthony J Frost

(57) ABSTRACT

An alignment film material and a preparation method thereof, an alignment film, a display substrate and a preparation method thereof, and a liquid crystal display device are provided. The alignment film material comprises: a base material for forming an alignment film matrix through a photoalignment; and a photo-thermal conversion material for generating heat under an ultraviolet light irradiation.

11 Claims, 2 Drawing Sheets

ALIGNMENT FILM MATERIAL AND PREPARATION METHOD THEREOF, ALIGNMENT FILM, DISPLAY SUBSTRATE AND PREPARATION METHOD THEREOF, AND LIQUID CRYSTAL DISPLAY DEVICE

TECHNICAL FIELD

Embodiments of the present disclosure relate to an alignment film material and a preparation method thereof, an alignment film, a display substrate and a preparation method thereof, and a liquid crystal display device.

BACKGROUND

In a liquid crystal display device, an alignment film is one of most important components, and is configured for making liquid crystal molecules in contact with the alignment film having a certain orientation. The alignment film generally is formed of a polyimide (PI) material. In order that the alignment film has alignment ability, an alignment treatment needs to be performed on the alignment film.

The alignment treatment for example is a rubbing alignment, i.e., a surface of the alignment film is rubbed with a rubbing roller with fine piles, thereby forming lots of tiny grooves on the surface of the alignment film and the lots of tiny grooves serving as an alignment structure. However, during the rubbing alignment process, there are lots of problems; for example, a pollutant may be brought into the alignment film, the alignment film may be easily damaged and so on.

SUMMARY

According to embodiments of the disclosure, an alignment film material is provided. The alignment film material comprises: a base material for forming an alignment film matrix through a photoalignment; and a photo-thermal conversion material for generating heat under an ultraviolet light irradiation.

For example, the photo-thermal conversion material includes any one or more of layered double hydroxides, a gold nano material, a carbon nano tube and a graphene.

For example, the layered double hydroxides include any one or more of zinc-aluminum layered double hydroxides, magnesium-aluminum layered double hydroxides, zinc-iron layered double hydroxides and zinc-chromium layered double hydroxides.

For example, the layered double hydroxides are modified by a modifying group, and the modifying group includes any one or more of a dihydrogen phosphate anion, an iminodiacetic acid anion and an amino trimethylene phosphonic acid anion.

For example, the photo-thermal conversion material is in a form of particle.

For example, a particle size of the photo-thermal conversion material is between 10 nm and 100 nm.

For example, in the alignment film material, a mass percentage of the photo-thermal conversion material is between 0.01% and 10%.

For example, in the alignment film material, the mass percentage of the photo-thermal conversion material is between 1% and 8%.

According to the embodiments of the disclosure, an alignment film is provided, and the alignment film is formed by the above alignment film material through the photoalignment.

According to the embodiments of the disclosure, a display substrate is provided, and the display substrate comprises the above alignment film.

According to the embodiments of the disclosure, a liquid crystal display device is provided, and the liquid crystal display device comprises the above display substrate.

According to the embodiments of the disclosure, a preparation method for an alignment film material is provided, and the method comprises: mixing a photo-thermal conversion material into a base material to obtain the alignment film material. The base material forms an alignment film matrix through a photoalignment, and the photo-thermal conversion material generates heat under an ultraviolet light irradiation.

For example, the photo-thermal conversion material includes any one or more of layered double hydroxides, a gold nano material, a carbon nano tube and a graphene.

For example, before the mixing the photo-thermal conversion material into the base material, the method further comprises: modifying the layered double hydroxides with a modifying group.

For example, the modifying group includes any one or more of a dihydrogen phosphate anion, an iminodiacetic acid anion and an amino trimethylene phosphonic acid anion.

According to the embodiments of the disclosure, a preparation method of a display substrate is provided. The method comprises: coating an alignment film material onto the display substrate to form a non-alignment film, wherein the alignment film material includes: a base material for forming an alignment film matrix through a photoalignment, and a photo-thermal conversion material for generating heat under an ultraviolet light irradiation; and irradiating the non-alignment film with light, so as to convert the non-alignment film into an alignment film.

For example, the non-alignment film is irradiated with a linearly polarized ultraviolet light, so as to convert the non-alignment film into the alignment film.

For example, before the irradiating the non-alignment film with light, the method further comprises: pre-baking the display substrate, so as to cure the non-alignment film.

For example, after the irradiating the non-alignment film with light so as to convert the non-alignment film into the alignment film, post-baking is not performed on the alignment film.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
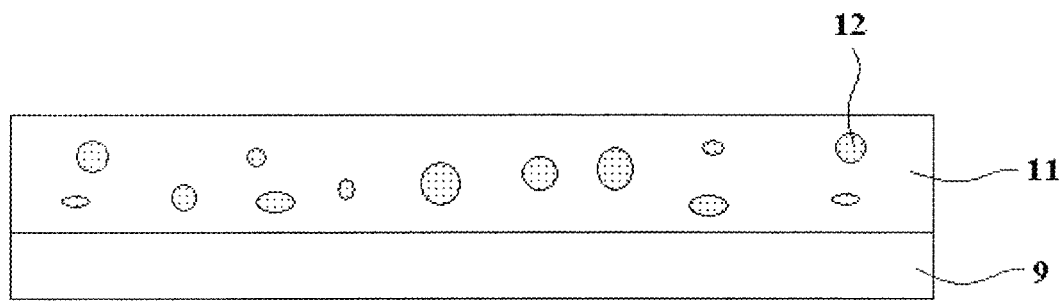
FIG. 1 is a structural schematic diagram of a partial cross-section of an alignment film according to embodiments of the present disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A photoalignment method is proposed so that the alignment film is aligned, i.e., an alignment film material is coated on a base substrate (such as a glass base substrate), then the alignment film material is irradiated with a linearly polarized ultraviolet light having a specific polarization direction, so that a molecular chain with a specific direction in the alignment film material breaks and thereby an alignment film with an alignment structure is formed. The photoalignment method avoids lots of problems of the rubbing alignment method; however, during the photoalignment process, many pyrolysis products serving as byproducts are produced while the molecular chain breaks, and these pyrolysis products may adversely influence properties of the alignment film. Therefore, after light irradiation is performed, a post-baking process needs to be performed on the alignment material, so as to remove the pyrolysis products. Thus, on one hand, the post-baking process causes the photoalignment method to be complicated technology, high in energy consumption and long in time consumption; on the other hand, the pyrolysis products are produced inside the alignment film and have effects of permeation, adsorption and the like, so that the pyrolysis products are very hard to be thoroughly removed by the post-baking process, and therefore quality of the alignment film is influenced.

Embodiments of the present disclosure provide an alignment film material, comprising a base material for forming an alignment film matrix through a photoalignment; a photo-thermal conversion material for generating heat under an ultraviolet light irradiation. For example, the photoalignment is performed by employing the ultraviolet light irradiation.

Besides the base material for forming the alignment film matrix through the photoalignment, the alignment film material according to the embodiments of the present disclosure further comprises the photo-thermal conversion material. The alignment film material is subjected to the ultraviolet light irradiation in the photoalignment process, the base material is aligned and produces pyrolysis products; and meanwhile, the photo-thermal conversion material absorbs the ultraviolet light and generates heat, so that a temperature of the alignment film material rises and the pyrolysis products are volatilized.

The alignment film material according to the embodiments of the present disclosure comprises the photo-thermal conversion material, and the photo-thermal conversion material generates heat under the light irradiation so as to enable the pyrolysis products to volatilize, and thus, an additional post-baking process is not needed, and the process is simplified.

Furthermore, as the photo-thermal conversion material is mixed in the base material, the heat generated by the photo-thermal conversion material evenly heats all portions of the alignment film from the inside of the alignment film; moreover, as the photo-thermal conversion material generates heat once light is irradiated, the pyrolysis products volatilize immediately after being produced without permeation, adsorption or the like. Accordingly, the pyrolysis products are removed effectively and thoroughly.

For example, the above-described base material takes polyimide as a major component, and further comprises other components, such as a photosensitive component and the like. For example, a commercially available alignment film material is adopted as the above-described base material, and specific components of the base material are no longer described in detail here.

For example, the photo-thermal conversion material includes any one or more of layered double hydroxides, a gold nano material (i.e., a gold particle with a size at a nanoscale), a carbon nano tube and a graphene. It should be understood that, the photo-thermal conversion material is not limited herein, and substances that generate heat under the ultraviolet light irradiation and do not cause an adverse effect to properties of the alignment film may all serve as the photo-thermal conversion material.

For example, the layered double hydroxides are formed by intercalation and assembly of lamellar layered double hydroxides (LDHs), and include main laminates and anions located between the laminates. The layered double hydroxides have a series of unique properties, for example, a chemical composition of the laminates can be adjusted and controlled, the anions can be adjusted and controlled, and a crystal particle size and distribution can be adjusted and controlled and so on.

For example, the above layered double hydroxides include any one or more of zinc-aluminum layered double hydroxides, magnesium-aluminum layered double hydroxides, zinc-iron layered double hydroxides and zinc-chromium layered double hydroxides.

Furthermore, the above layered double hydroxides for example are ZnAl—$CO_3$LDHs, MgAl—$CO_3$LDHs, ZnFe—$CO_3$LDHs, ZnCr—$CO_3$LDHs and the like. Part of bonds (such as Zn—O bonds) of these materials absorb the ultraviolet light so that electrons in a ground state transit to an excited state, and a back transition process of the electrons in the excited state to the ground state cause these bonds to vibrate and generate heat, thereby enabling these materials to generate heat under the ultraviolet light irradiation.

For example, the layered double hydroxides are modified through a modifying group, the modifying group for examples includes any one or more of a dihydrogen phosphate anion, an iminodiacetic acid anion and an amino trimethylene phosphonic acid anion.

That is, modification treatment for example is performed on the layered double hydroxides with the above modifying groups, thereby introducing the modifying groups into the layered double hydroxides (including displacing the anions between the laminates of the layered double hydroxides, grafting at an outer side of the layered double hydroxides, attaching to the outer side of the layered double hydroxides and so on), and these modifying groups enhance the ability of the layered double hydroxides in absorption of the ultraviolet light and promote the heat to be released, so as to increase heat generating efficiency of the layered double hydroxides. Meanwhile, a majority of the above modifying groups are organic matter or are comparatively similar to the organic matter in nature, so that in the case that the layered double hydroxides are added to the base material (of which the major constituent is polyimide), the modifying groups are conducive to enable the layered double hydroxides to be mixed with the base material better, and thus the layered double hydroxides are distributed in the base material more uniformly.

For example, the photo-thermal conversion material is in a form of particle, and a particle size thereof is between 10 nm and 100 nm. That is, the photo-thermal conversion material is in the form of particle at the nanoscale, so as to be evenly distributed in the base material.

For example, in the alignment film material, a mass percentage of the photo-thermal conversion material is between 0.01% and 10%. Further, for example, in the alignment film material, a mass percentage of the photo-thermal conversion material is between 1% and 8%. In the case that the content of the photo-thermal conversion material of the alignment film material is excessively low, generated heat is not enough to enable the pyrolysis products to volatilize; while in the case that the content of the photo-thermal conversion material is excessively high, the alignment property of the alignment film itself is influenced.

As shown in FIG. 1, the embodiments of the present disclosure further provide an alignment film, which is formed by the above-described alignment film material through photoalignment.

For example, the above alignment film material is coated on a base substrate 9, and then cured and photoaligned so as to form the alignment film used for liquid crystal display. In the formed alignment film, an alignment film matrix 11 (i.e., the part of the alignment film that achieves the alignment function) is formed by the above base material, and the photo-thermal conversion material 12 is cured and distributed in the alignment film matrix 11.

The embodiments of the present disclosure further provide a display substrate, comprising the above-described alignment film.

For example, the display substrate according to the embodiments of the present disclosure is an array substrate, an opposed substrate and the like, and comprises the above-described alignment film.

The embodiments of the present disclosure further provide a liquid crystal display device, and the liquid crystal display device comprises the above-described display substrate. For example, the liquid crystal display device is any product or component with a display function, such as a liquid crystal display panel, an electronic paper, a mobile phone, a tablet computer, a television, a display, a notebook computer, a digital photo frame and a navigator.

The embodiments of the present disclosure further provide a preparation method for an alignment film material, comprising: mixing a photo-thermal conversion material into a base material to obtain an alignment film material; wherein, the base material forms an alignment film matrix through photoalignment, and the photo-thermal conversion material generates heat under ultraviolet light irradiation.

For example, the above alignment film material is obtained by mixing the photo-thermal conversion material with the base material (for example, the base material is a commercially available alignment film material). In the embodiments of the present disclosure, the method for mixing the photo-thermal conversion material into the base material is not specially limited; for example, the photo-thermal conversion material and the base material are mixed uniformly.

For example, the photo-thermal conversion material includes any one or more of layered double hydroxides, a gold nano material (i.e., a gold particle of which a size is at a nanoscale), a carbon nano tube and a graphene.

For example, before the mixing the photo-thermal conversion material into the base material, the preparation method for the alignment film material further comprises: modifying the layered double hydroxides with a modifying group, and the modifying group for example includes any one or more of a dihydrogen phosphate anion, an iminodiacetic acid anion and an amino trimethylene phosphonic acid anion. That is, before the layered double hydroxides are added to the base material, the above modification treatment is performed on the layered double hydroxides.

Exemplarily, the method for preparing the alignment film comprises:

S301: adding a commercially available zinc-aluminum layered double hydroxides (a particle size thereof is from 10 nm to 100 nm) into deionized water and evenly stirring, to form a solution (a mass percentage of the zinc-aluminum layered double hydroxide therein is 10%), heating the solution to about 150 Celsius degrees, and regulating a pH value of the solution to about 4.5; introducing a nitrogen gas to discharge air out of the solution, adding another solution containing the dihydrogen phosphate anion (taking a potassium dihydrogen phosphate solution as an example) under magnetic stirring and ensuring that molar concentration of the dihydrogen phosphate anion in the solution is greater than that of the zinc-aluminum layered double hydroxides, then reacting for 6 hours under full stirring and continuously introducing the nitrogen gas for protection during reaction.

S302: centrifugally washing a product formed by the above reaction to be approximately neutral, fully drying the product under 120 Celsius degrees, and milling the product to obtain the nano zinc-aluminum layered double hydroxides modified by the dihydrogen phosphate anion.

S303: mixing the above nano zinc-aluminum layered double hydroxides (which severs as the photo-thermal conversion material) modified by the dihydrogen phosphate anion with an RN-3334 type commercially available alignment film material (which serves as the base material), and stirring fully and evenly, to obtain the alignment film material according to the embodiments of the present disclosure.

Figure 2:
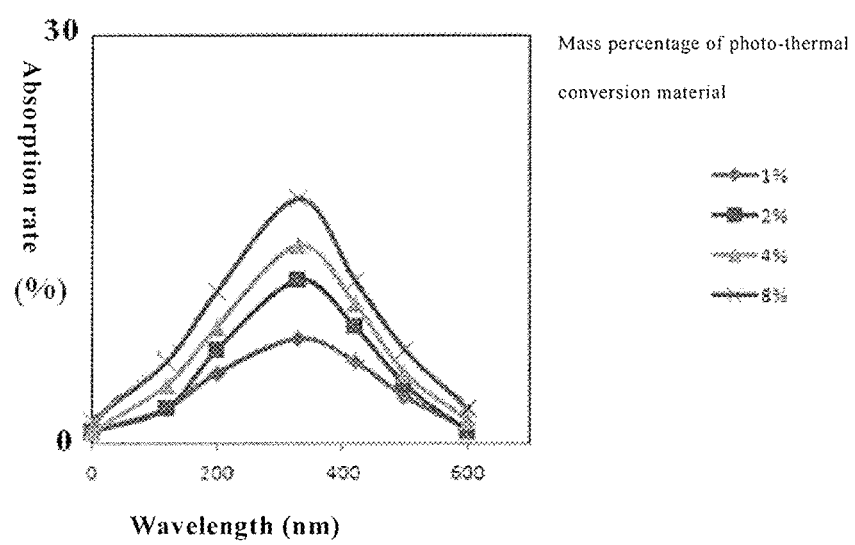
FIG. 2 is an ultraviolet light absorption spectrum of alignment film materials different in content of a photo-thermal conversion material according to the embodiments of the present disclosure.

The alignment film materials different in mass percentage of the photo-thermal conversion material (for example, the above-described nano zinc-aluminum layered double hydroxides modified by the dihydrogen phosphate anion) are prepared and ultraviolet light absorption rates thereof are respectively tested, and a test result is shown in FIG. 2. It can be seen that, each of the above alignment film materials has an absorption peak under a wavelength of about 300 nm, and the higher the content of the photo-thermal conversion material is, the higher the absorption capacity is, which shows that the alignment film material according to the embodiments of present disclosure absorbs the ultraviolet light very well and generates heat in the photoalignment process, thereby effectively removing pyrolysis products, so as to simplify the preparation process for the alignment film and increase quality of the alignment film product.

Figure 3:
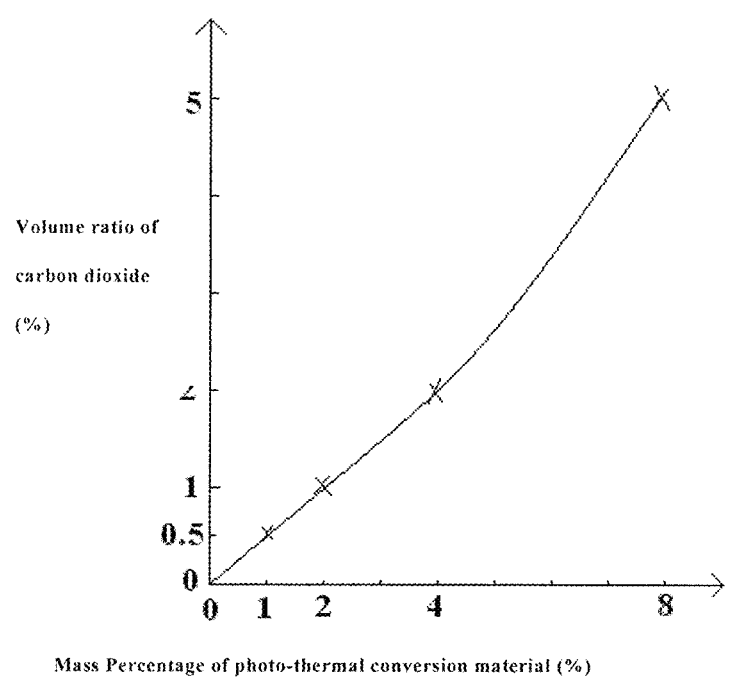
FIG. 3 is a concentration comparison diagram of carbon dioxide generated during aligning alignment film materials different in content of the photo-thermal conversion material according to the embodiments of the present disclosure.

For example, in an airtight nitrogen gas environment, the photoalignment is performed on each of the above alignment film materials, content of carbon dioxide (one of main products after the pyrolysis products volatilize) in the airtight nitrogen gas environment after alignment is finished is tested, and a test result is as shown in FIG. 3. It can be seen from FIG. 3 that, in the case that the above photo-thermal conversion material is not contained, there is no carbon dioxide in the atmosphere, which shows that the pyrolysis products cannot volatilize; with increase of content of the photo-thermal conversion material, the carbon dioxide is increased continuously in content, which shows that the photo-thermal conversion material enables the pyrolysis products to fully volatilize.

The embodiments of the present disclosure further provide a preparation method for a display substrate, comprising: applying the above-described alignment film material to the display substrate, to form a non-alignment film layer, irradiating the non-alignment film layer with light, so as to convert the non-alignment film layer into an alignment film.

For example, the non-alignment film layer is irradiated with a linearly polarized ultraviolet light, so as to convert the non-alignment film layer into the alignment film.

For example, before the irradiating the non-alignment film layer with light, the method further comprises: pre-baking the display substrate, so as to cure the non-alignment film layer.

As the above alignment film materials are employed, the preparation method for the display substrate according to the embodiments of the present disclosure does not comprise a post-baking step, and therefore pyrolysis products are removed more thoroughly while the process is simplified.

Exemplarily, the preparation method for the display substrate according to the embodiments of the present disclosure comprises:

S401: coating the above alignment film material onto the display substrate (for example, the display substrate is an array substrate or an opposed substrate) by a spin-coating method, to form the non-alignment film layer (for example a thickness thereof is 100 nm).

S402: pre-baking the display substrate, so as to cure the non-alignment film layer (for example, the display substrate is heated for 90 seconds at 80° C.).

S403: irradiating the non-alignment film layer with the linearly polarized ultraviolet light (for example, a wavelength of the ultraviolet light is 330 nm, and light exposure is 100 mJ/cm$^2$), so as to convert the non-alignment film layer into the alignment film. In the process of light irradiation, a specific molecular chain in the base material of the alignment film material breaks to form the alignment film with specific alignment and generates pyrolysis products; the photo-thermal conversion material generates heat upon being irradiated by light, which enables the pyrolysis products to be heated to volatilize once being generated.

As specific modes for forming the alignment film with the alignment film material through photoalignment are diversified, the above steps S401-S403 and parameters are not limitative of the present disclosure.

The foregoing embodiments merely are exemplary embodiments of the disclosure, and not intended to define the scope of the disclosure, and the scope of the disclosure is determined by the appended claims.

The present application claims priority of Chinese Patent Application No. 201610007276.1 filed on Jan. 6, 2016, the present disclosure of which is incorporated herein by reference in its entirety as part of the present application.

The invention claimed is:

1. An alignment film material, comprising:
    a base material for forming an alignment film matrix through a photoalignment; and
    a photo-thermal conversion material for generating heat under an ultraviolet light irradiation,
    wherein the photo-thermal conversion material is located in the alignment film matrix, and completely surrounded by the alignment film matrix.

2. The alignment film material according to claim 1, wherein,
    the photo-thermal conversion material includes any one or more of layered double hydroxides, a gold nano material, a carbon nano tube and a graphene.

3. The alignment film material according to claim 2, wherein,
    the layered double hydroxides include any one or more of zinc-aluminum layered double hydroxides, magnesium-aluminum layered double hydroxides, zinc-iron layered double hydroxides and zinc-chromium layered double hydroxides.

4. The alignment film according to claim 2, wherein,
    the layered double hydroxides are modified by a modifying group, and the modifying group includes any one or more of a dihydrogen phosphate anion, an iminodiacetic acid anion and an amino trimethylene phosphonic acid anion.

5. The alignment film material according to claim 1, wherein,
    the photo-thermal conversion material is in a form of particle.

6. The alignment film material according to claim 5, wherein,
    a particle size of the photo-thermal conversion material is between 10 nm and 100 nm.

7. The alignment film material according to claim 1, wherein,
    in the alignment film material, a mass percentage of the photo-thermal conversion material is between 0.01% and 10%.

8. The alignment film material according to claim 7, wherein,
    in the alignment film material, the mass percentage of the photo-thermal conversion material is between 1% and 8%.

9. An alignment film, formed by the alignment film material according to claim 1 through the photoalignment.

10. A display substrate, comprising the alignment film according to claim 9.

11. A liquid crystal display device, comprising the display substrate according to claim 10.

* * * * *